Aug. 29, 1967

C. L. HARMS ETAL

3,338,283

IN-FEED MECHANISM FOR SLICING MACHINES

Filed July 19, 1965

Inventors:
Clarence L. Harms
and Richard E. Doerfer
By Bair, Freeman & Molinare Attys.

United States Patent Office 3,338,283
Patented Aug. 29, 1967

3,338,283
IN-FEED MECHANISM FOR SLICING MACHINES
Clarence L. Harms and Richard E. Doerfer, Cedar Falls, Iowa, assignors to Doerfer Engineering & Design, Inc., Cedar Falls, Iowa, a corporation of Iowa
Filed July 19, 1965, Ser. No. 473,018
19 Claims. (Cl. 146—95)

This invention relates to an automatic in-feed mechanism for slabs of bacon and the like, the same being adaptable to most standard slicing machines.

One object of the invention is to provide such mechanism of comparatively simple and inexpensive construction which greatly reduces the normal work and attentiveness required of the operator of a bacon slicer, thus freeing him for other work such as grading or packaging bacon.

Another object is to provide in-feed mechanism which includes a conveyor system, a slab carriage and a sequencing mechanism for a gripper carriage of a slicing machine wherein the conveyor system is adapted to receive slabs of bacon and will cooperate with the slab carriage to automatically feed the slabs of bacon to the slicing machine as they are required by the cycling of the gripper carriage of the machine.

Still another object is to provide the sequencing mechanism for the gripper carriage designed to minimize the time required for the complete slicing of each slab of bacon by providing an automatic fast feed period while the bacon slab is preliminarily being advanced to the slicing knife instead of the usual slow regulated feed for both the preliminary advance operation as well as the slicing operation.

A further object is to provide the sequencing mechanism so designed that it can be readily attached to most slicing machines, as can also the conveyor system and slab carriage, with the conveyor system parallel to the slicer table of the machine and the slab carriage arranged for moving the slabs laterally off the conveyor system and on to the slicer table.

Still a further object is to provide a sequencing mechanism comprising a valve actuating arm pivoted to the slicer table of the machine and cam means carried by the gripper carriage and cooperating with the valve actuating arm to automatically cycle the gripper carriage and to also automatically cycle the slab carriage, the sequencing mechanism being adjustable for batches of different length bacon slabs to secure minimum timing per cycle and thereby maximum production.

An additional object is to provide a control system for various hydraulic, pneumatic and electrical components of the mechanism to accomplish the various control functions required for the automatic cycling of our in-feed mechanism.

Another additional object is to provide for manual control of the sequencing mechanism in case there is any malfunctioning or if out-size slabs of bacon or similar irregularities are encountered.

With these and other objects in view, our invention consists in the construction, arrangement and combination of the various parts of our in-feed mechanism for slicing machines, whereby the objects above contemplated are attained, as hereinafter more fully set forth, pointed out in our claims and illustrated in detail on the accompanying drawings, wherein:

FIG. 4 is a perspective view similar to FIG. 1 showing certain mechanism omitted from FIG. 1 and omits some of the elements shown in FIG. 1;

On the accompanying drawings we have used the reference numeral 10 to indicate a slicer table of a standard slicing machine along which slabs 12 of bacon may be propelled toward a slicing knife 14 within a housing 16. The slicing knife and housing are of the usual construction, the knife being rotated by a transmission 18 from an electric motor 20. The motor 20 also drives a hydraulic pump 22 for supplying fluid pressure to a hydraulic circuit to be described later.

Figure 9:
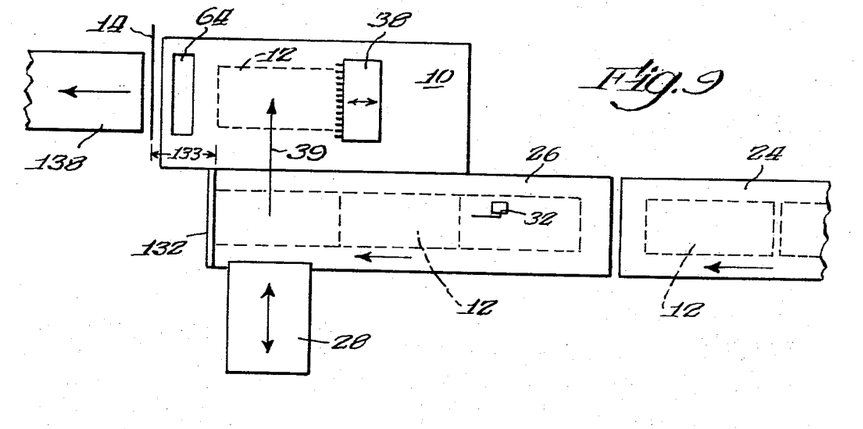
FIG. 9 is a diagrammatic plan view of our in-feed mechanism to show component relationships.

We provide a conveyor system and a slab carriage mechanism, which will now be described, to automatically deliver the slabs 12 to the slicer table 10. The conveyor system consists of a feed conveyor 24 and a slicer conveyor 26, the feed conveyor delivering slabs to the slicer conveyor. The slab carriage mechanism comprises a slab carriage 28 for moving the slabs laterally from the slicer conveyor 26 on to the slicer table 10 as illustrated in FIG. 9. The feed conveyor 24 is driven by an electric motor 30 under the control of a feed conveyor limit switch 32 while the slicer conveyor 26 is continuously driven by a slicer conveyor motor 34. The slab carriage 28 is reciprocated by a pneumatic cylinder and piston unit 36.

Figures 2, 3:
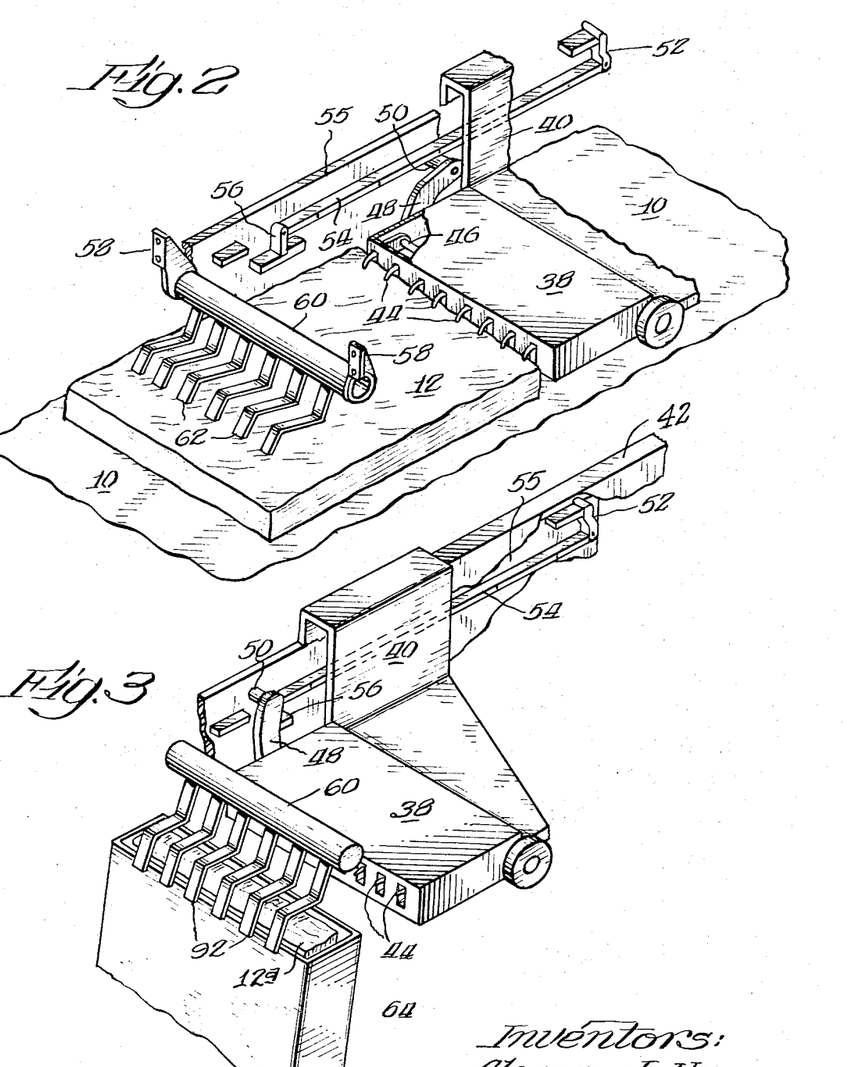
FIG. 2 is an enlarged perspective view of a portion of FIG. 1 showing the parts in a different position.
FIG. 3 is a similar perspective view showing the parts in a further different position.

For propelling the slabs of bacon along the slicer table 10 after they have been deposited thereon by the slab carriage 28, a gripper carriage 38 is supported as by a bracket 40 slidable along a guide rail 42. The gripper carriage is provided with a series of pivoted gripper claws 44. As shown in FIG. 2 the gripper claws are mounted on a rock shaft 46 with which a control lever 48 at one end of the gripper carriage is operatively connected. A roller 50 is carried by the lever 48 and is adapted to coact with a control bar 54 and a pair of spring loaded flippers 52 and 56 adjacent the ends of the bar as will hereinafter appear. The bar and fingers are mounted on a vertical wall 55 of the table 10.

Mounted on the slicer knife housing 16 as by means of a pair of brackets 58 shown in FIG. 2 is a hold-down finger supporting shaft 60 from which a series of individually sprung hold-down fingers 62 project. The hold-down fingers 62 cooperate with the slabs 12 of bacon as shown in FIG. 2 and with a slab end chute 64 as shown in FIG. 3 as will also hereinafter appear.

Figure 10:
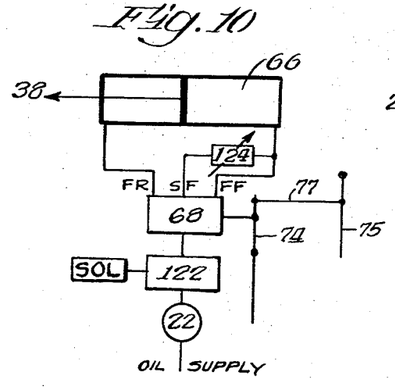
FIG. 10 is a block diagram of hydraulic elements and circuitry for our in-feed mechanism.

For propelling the bracket 40 and thereby the gripper carriage 38 back-and-forth along the slicer table 10, a hydraulic cylinder and piston unit 66 is provided which is shown diagrammatically in FIG. 10. A control valve 68 is provided therefor and we provide a hydraulic and air sequencing mechanism for automatically controlling the valve 68 shown particularly in FIGS. 4, 5, 6, 7 and 8 which will now be described.

Figure 5:
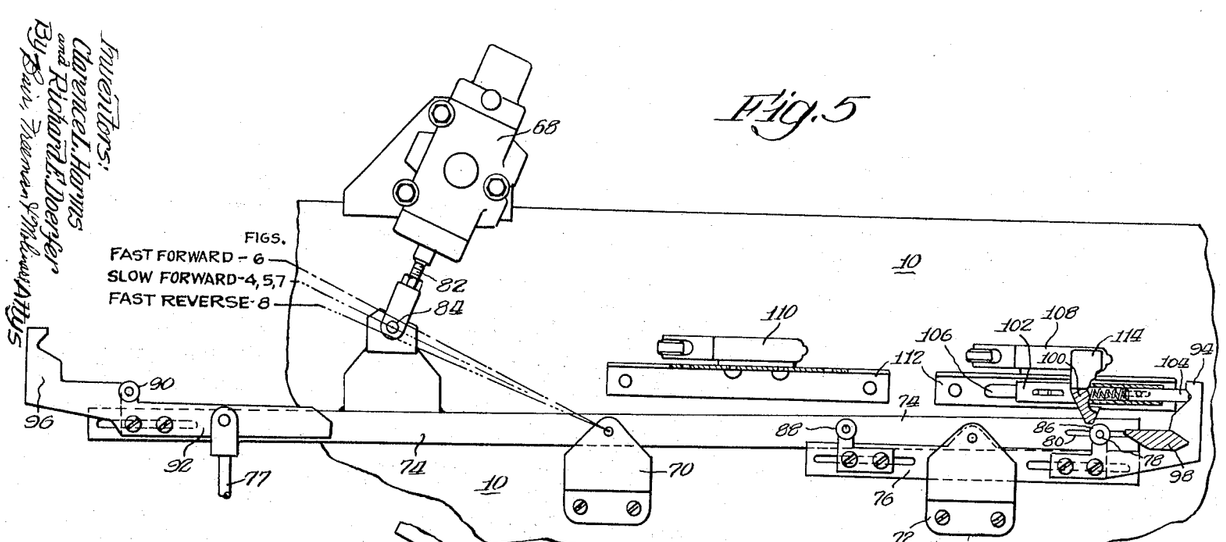
FIG. 5 is a plan view of a hydraulic and air sequence mechanism shown in perspective in FIG. 4 with parts thereof in the position of FIG. 4.
Figure 6:
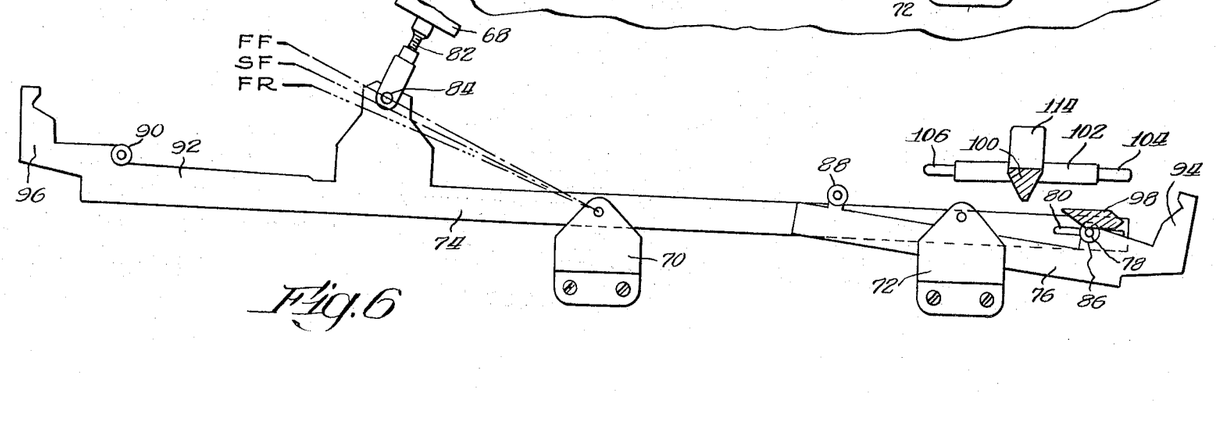
FIGS. 6, 7 and 8 are similar plan views showing the sequence mechanism in different progressive positions during certain phases of operation of our in-feed mechanism.
Figure 7:
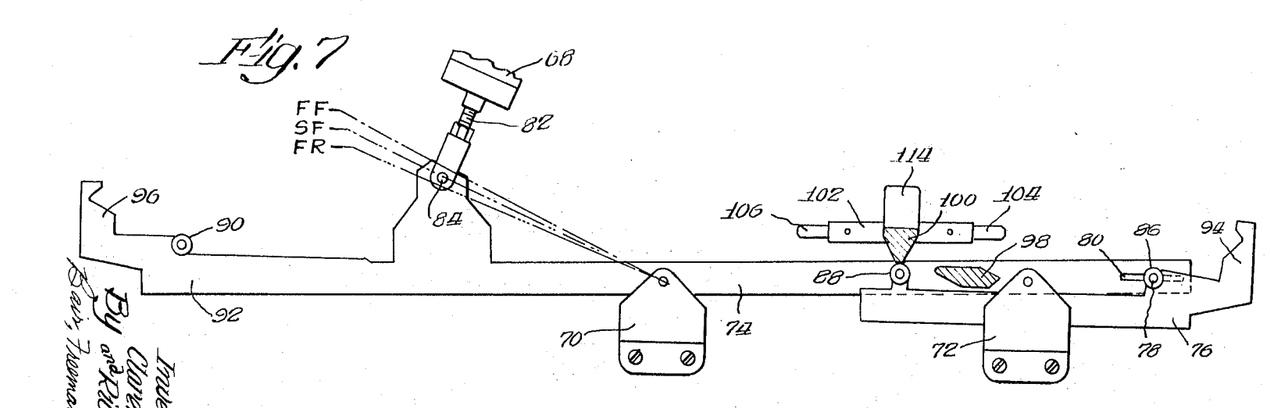
Figure 8:
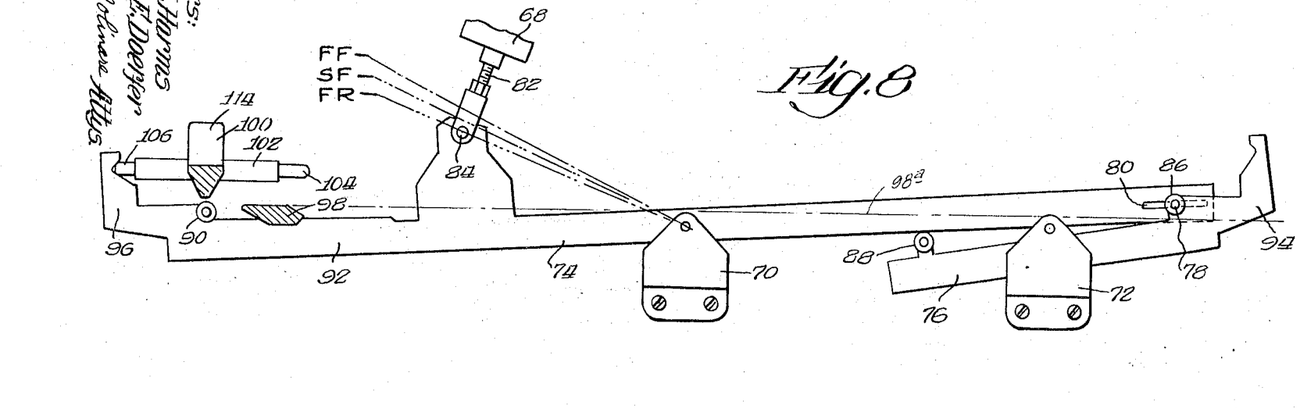

Referring particularly to FIGS. 4 and 5 (FIGS. 6, 7 and 8 being somewhat simplified with respect to FIG. 5 by the omission of details unnecessary to an understanding of the operation of the sequencing mechanism in its various positions), a pair of brackets 70 and 72 are mounted on the slicing table 10 and pivotally support a valve actuating arm 74 and a rocker arm 76, respectively. The arms 74 and 76 are operatively connected together by means of a pin 78 carried by the arm 76 and projecting through a slot 80 of the arm 74. The valve actuating arm 74 controls the position of the control valve 68 which has a valve actuating stem 82 projecting therefrom and pivoted at 84 to a bracket extending from the arm 74. The pivot 84 is adapted to assume three different positions under the control of the arm 74 as indicated by the legends "FAST FORWARD," "SLOW FORWARD" and "FAST REVERSE" in FIG. 5. Between these legends and the pivot 84 the numbers 6, 4–5–7, and 8 appear which indicate the figures in which the different enumerated positions occur. In FIGS. 6, 7 and 8 the legends FF, SF and FR are used instead of FAST FORWARD, SLOW FORWARD and FAST REVERSE.

Two rollers 86 and 88 are carried by the rocker arm 76 and a roller 90 is carried by the valve actuating arm 74. The rollers 86 and 88 are mounted on brackets which are adjustable lengthwise of the rocker arm 76 and the roller 90 is carried by a bracket 92 which is adjustable lengthwise of the valve actuating arm 74 as obvious from an inspection of FIG. 5 wherein slot and clamp screw adjustment means are provided for such adjustments. These adjustments make possible the handling of batches of different length slabs 12 in the least cycle time for each batch. The roller 86 is mounted on the pin 78 previously referred to. The bracket for the roller 86 includes a notched detent follower 94 and the bracket 92 includes a notched detent follower 96.

Coacting at times with the pin 78 is a fast advance cam 98 and coacting with the rollers 86, 88 and 90, at times, is a second cam 100. These cams are shown in cross section in FIG. 5 as they project downwardly from the bracket 40 so as to travel with the bracket and thereby with the gripper carriage 38 shown in FIG. 4 (wherein they are also sectioned). Also, carried with the cam 100 is an arm positioning bracket 102 in the form of a tube in which is slidably mounted a pair of spring pressed detent pins 104 and 106 to coact at times with the detent followers 94 and 96, respectively.

In addition to the valve actuating arm 74 being controlled by the cams 98 and 100 in an automatic manner as will hereinafter appear, the arm may be controlled manually to override the automatic operation. For this purpose a manual control lever 75 is provided (see FIG. 4) connected thereto by a link 77.

A slab carriage advance valve 108 and a slab carriage return valve 110 are mounted on brackets 112 of the slicing table 10 and may be adjusted longitudinally of the brackets in an obvious manner for operations at different points in the travel of the gripper carriage 38, the valves 108 and 110 being operated by a cam 114 extending from the cam 100 and the arm positioning bracket 102.

Having described the main features of our in-feed mechanism, we will now describe the operation thereof, the essential elements of the hydraulic, pneumatic and electric circuitry therefor and other details of the mechanism not already described.

*Practical operation*

Figure 1:
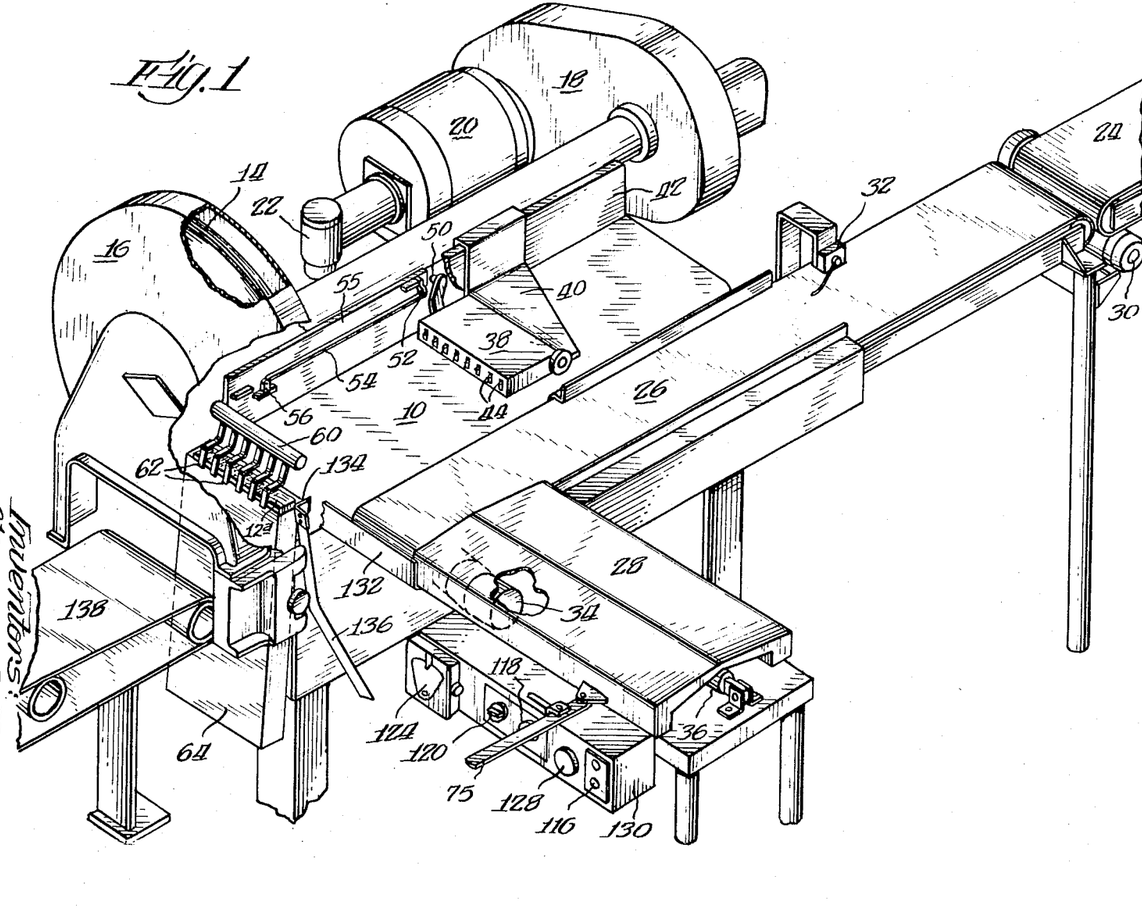
FIG. 1 is a perspective view of our automatic bacon slab in-feed mechanism with some of the mechanism omitted.
Figure 12:
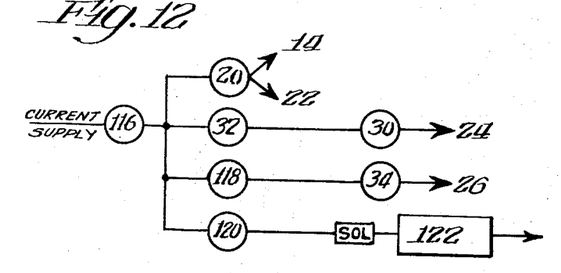
FIG. 12 is a block diagram of electrical elements and circuitry therefor.

In the operation of our in-feed mechanism, the operator pushes an electric start button 116 shown in FIGS. 1 and 12 which effects energization of the electric motor 20 to rotate the slicing knife 14 and operate the hydraulic pump 22. Additionally, the feed conveyor motor 30 is energized providing the feed conveyor limit switch 32 is closed due to the absence of a slab of bacon to open this switch. If a slicer conveyor switch 118 and a gripper carriage switch 120 are turned on, the slicer conveyor 26 and the gripper carriage 38 also begin operation. The operator may independently stop the slicer conveyor 26 and gripper carriage 38 functions at any time, however, by turning the switches 118 and 120 off.

The operation of the gripper carriage 38 is effected by means of an electric solenoid valve 122 shown in FIGS. 10 and 12 in addition to the control valve 68 and a flow control valve 124 shown in FIGS. 1 and 10. This particular valve may be adjusted for determining the speed of the piston in the hydraulic cylinder and piston unit 66 to thereby adjust the thickness of the slice cut from the slab of bacon each revolution of the slicing knife 14.

The solenoid valve 122 allows pressure from the hydraulic pump 22 to circulate through the hydraulic system of FIG. 10 subsequently exerting pressure against that end of the piston of the unit 66 which moves the gripper carriage 38 in one direction or the other as determined by the position of the control valve 68 depicted in FIGS. 4, 5, 6, 7 and 8.

When a series of slabs 12 of bacon or the like are consecutively placed on the feed conveyor 24, they proceed onto the slicer conveyor 26 as shown in FIG. 9. As soon as the first slab reaches the feed conveyor limit switch 32, it stops the operation of the feed conveyor by de-energizing the motor 30 and starts it again after the slab has passed. The limit switch is so positioned that at least two closely spaced slabs may proceed onto the slicer conveyor before stopping operation of the feed conveyor thereby reducing the frequency of stops and starts of the feed conveyor motor 30. Transportation and trucking of bacon slabs is reduced by this type of conveyor system by means of which the slabs may be conveyed directly from the bacon press or from inside the storage cooler to the slicer which is generally located in a warmer area. In many systems loading of the conveyor may be accomplished by a previous trucker. By transporting single slabs directly from the cold storage area to the slicer, slab temperatures may be maintained within closer limits providing easier slicing and less downgrading after slicing. Also, less human handling of slabs means less contamination.

Figure 11:
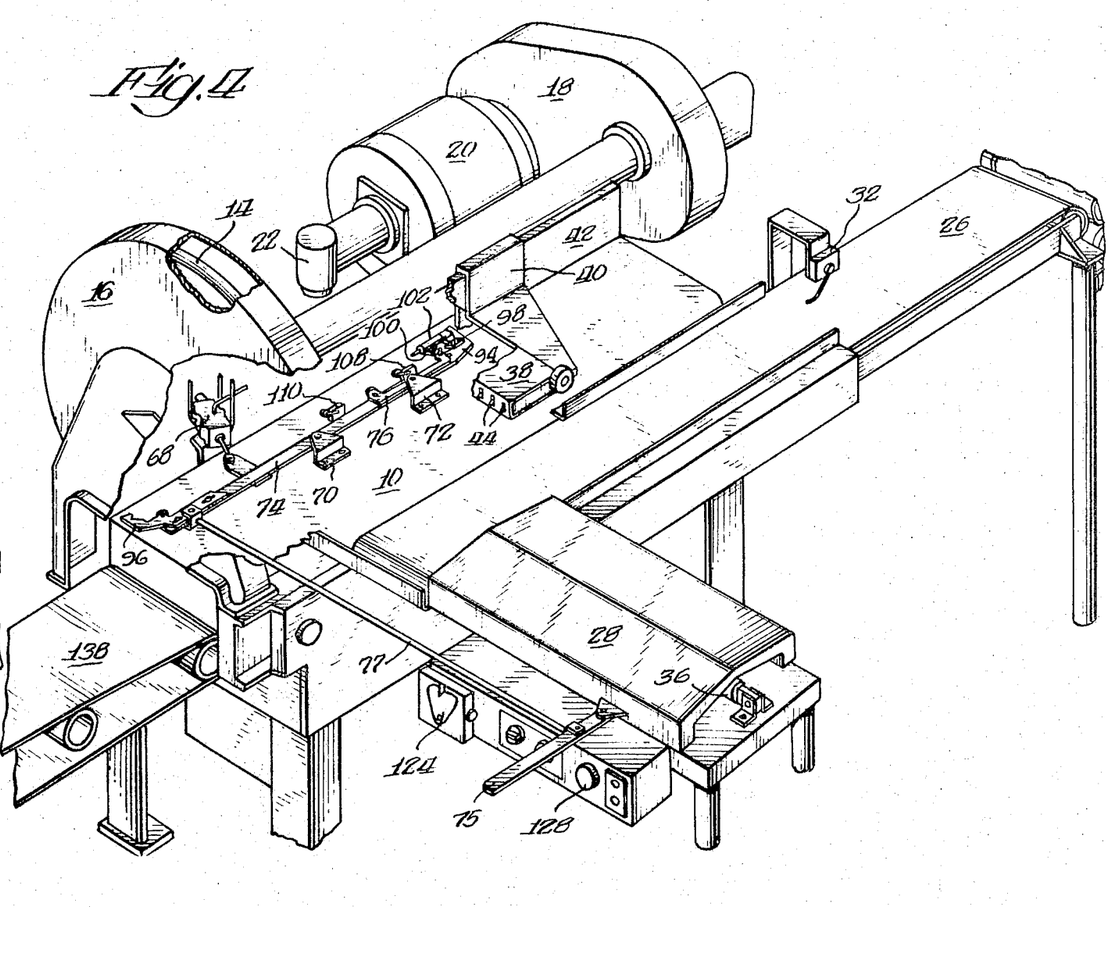
FIG. 11 is a block diagram of pneumatic elements and circuitry therefor.

The slab carriage 28 pushes the slabs laterally from the slicer conveyor 26 onto the slicer table 10 in front of the gripper carriage 38 (arrow 39 in FIG. 9). Operation of the slab carriage is effected by the pneumatic cylinder and piston unit 36 which is of double-acting type and is controlled by a pilot actuated valve 126 shown in FIG. 11 under the control of the slab carriage advance pilot valve 108 and the slab carriage return pilot valve 110 shown in FIGS. 4 and 5. FIG. 11 also shows a manual slab carriage return pilot valve 128 for use of the operator which is mounted along with previously described control devices 75, 116, 118, 120 and 124 on a control box 130 shown in FIG. 1 in front of the operator at his station with respect to the in-feed mechanism and the slicing machine. The valve 128 may be used by the operator at any time he disires to return the slab carriage to its retracted position. The control box 130 is mounted in the position shown so that the controls are readily accessible to the operator even though we have added the conveyors 24 and 26 and the slab carriage 28 to the standard slicing machine.

When the slab carriage 28 is in the retracted position, a slab of bacon is allowed to be moved by the slicer conveyor 26 until it is stopped by a fence 132 shown in FIGS. 1 and 9. The continuous running slicer conveyor holds the slabs against the fence because of sliding friction of the conveyor belt under the slabs. Since the conveyor is relatively short and because the feed conveyor 24 does not operate when slabs are located under the limit switch 32, the sliding force of only a few slabs is exerted end-to-end from the slabs to the fence, thus preventing buckling and pile-up of the slabs.

Because of the construction of standard bacon slicers the slab may be pushed for some distance by the gripper carriage 38 before the rotating knife 14 begins slicing on the end of the slab. This distance is noted as the distance 133 in FIG. 9 from the fence 132 to the knife in the direction of slab slicing travel. Since the slicer is doing no beneficial work while the slab is moving this distance, it is desirable to keep the time required for movement throughout such distance to a minimum. In other words, it is desirable to move the gripper carriage 38 as fast as possible for this distance. The hydraulic valving on standard slicers does not make provision for this and we have developed the valve actuating mechanism disclosed in FIGS. 4, 5, 6, 7 and 8 to accomplish that purpose.

As already noted, the control valve 68 is a three-position type and when the gripper carriage 38 is in the retracted position shown in FIGS. 1, 4 and 5, the valve actuating arm 74 is in the SLOW FORWARD position. It will be noted that the detent pin 104 is in the notch of the detent follower 94 and is under some tension produced by the spring illustrated within the arm positioning bracket 102. Starting with this position, it is now evident that the valve actuating arm 74 will stay in the SLOW FORWARD position of FIG. 5 until the fast advance cam 98 engages the pin 78 and moves it to the position shown in FIG. 6 whereupon the valve actuating arm is in the FAST FORWARD (FF) position. The pin 78 moves the valve actuating arm into the FAST FEED position by means of the slot 80 in an obvious manner.

The gripper carriage 38 continues to move rapidly forward until the cam 100 engages the roller 88 as shown in FIG. 7 whereupon the valve actuating arm 74 is positioned in the SLOW FORWARD (SF) position. The parts are adjusted to the length of bacon slabs being sliced so that this slow feed starts just before the advance end of the slab reaches the slicing knife 14.

During the slicing operation the hydraulic cylinder and piston unit 66 is under control of the flow control valve 124 which has been set by the operator for the desired thickness of slice and, of course, can be adjusted to change the thickness as desired by speeding up the piston travel for thick slices or slowing it down for thin slices. As the slab 12 moves forward a side trim knife 134 shown in FIG. 1 trims the excess width from the slab allowing the trimming to fall down a chute 136 into a suitable receptacle.

As the gripper carriage moves forward, the gripper arm 48 is forced down by the engagement of its roller 50 with the flipper 52 and the roller then travels under the control bar 54 as shown in FIG. 2 which causes the gripper claws 44 to enter the top surface of the slab 12 adjacent its rearward end.

The hold-down fingers 62 hold the end of the slab down near the slicing knife 14. Slicing of the slab continues in the conventional manner. The operator still has control of the gripper carriage control valve 68 by means of the lever 75 so that at any time he can override the automatic control and cause the gripper carriage to move FAST FORWARD, SLOW FORWARD or FAST REVERSE, whichever desired.

The cam 114 attached to the arm positioning bracket 102 shown in FIG. 5 during the forward movement of the gripper carriage 38 engages the slab carriage return valve 110 and causes the slab carriage 28 to return at mid-travel of the gripper carriage 38. The gripper arm 48 and the roller 50 proceed along the control bar 54 and eventually the roller moves the spring loaded flipper 56 out of its way as it goes by.

When the gripper carriage reaches the end of its travel adjacent the slicing knife, the cam 100 engages the roller 90 as shown in FIG. 8 and forces the valve actuating arm 74 to the FAST RETURN (FR) position shown in FIG. 8. To avoid an intermediate poor-flow position of the control valve 68, the detent pin 106 and the detent follower 96 cooperate in such manner just previous to the FIG. 8 position that the detent pin has compressed its spring as the pin strikes the side of the notch in the detent and this subsequently causes the pin to move into the bottom of the notch thereby completing the shift to the FAST REVERSE position. Likewise, when the cam 100 returns to a position just before reaching that shown in FIG. 4, the cam 98 will have passed under and cleared the pin 78 after which the cam 100 will have engaged the roller 86 to nearly complete the shift from the FIG. 8 position to the FIG. 5 position, such shift being completed by the energy stored in the spring and pin 104 without stopping in an intermediate poor-flow position of the valve 68.

As the gripper carriage 38 returns, the gripper arm 48 and roller 50 contact the flipper 56 as shown in FIG. 3. The flipper causes the arm to move up thereby allowing the gripper claws 44 to release the short end of the bacon slab. At this point the hold-down fingers 62 have been elevated by the forward edge of the gripper carriage which causes them to release the slab end and it falls freely into the chute 64 from which it may be discharged into a suitable receptacle. The bacon slices sliced off by the knife 14 are "shingled" onto a conveyor 138.

Near the end of the return travel of the gripper carriage 38, the gripper arm 48 is allowed to move past the spring-loaded flipper 52 just before reaching the position shown in FIG. 1 and when it does reach the FIG. 1 position, the parts are in position for another forward advance of the gripper carriage.

Also near the end of the return travel of the gripper carriage, the cam 114 engages the slab carriage advance valve 108 which causes another slab to be moved into place on the slicer table 10 in front of the gripper carriage. The machine is now ready for the next cycle.

From the foregoing description, it will be obvious that we have provided an automatic slab in-feed mechanism which is capable of increasing production with less expenditure of man-hours than when a slicing machine is hand-fed. There are numerous additional advantages such as higher production rates of the slicer because of fast uniform continuous feeding of slabs into it. An operator is not normally inclined to be as consistent in feeding a new slab into the machine at exactly the right time. He would not normally move the end of the slab up to the slicer blade rapidly before slowing it down to the normal slicing rate. Our mechanism also automatically and uniformly trims the slabs to a maximum width for proper fit in the package by means of the incorporated side trimming knife 34.

The hydraulic and air sequence mechanism is so designed that adjustments can be made as required by the variable length of slabs thereby accommodating continuous runs of short or long slabs and keeping the time required in moving the gripper carriage up to the slab at a minimum. Also, the time of SLOW FORWARD movement at the beginning of the forward travel of the gripper carriage is kept at a minimum by adjusting the pin 78 in relation to the cam 98 thus making a very short slow travel. However, there must be enough time for the slab carriage to push the longest slab in front of the gripper carriage and still have its end clear the gripper carriage as it is approaching the end of its FAST RETURN stroke and before it contacts the end of the slab in FAST FORWARD travel. It is not necessary that the gripper claws engage the slab before the gripper carriage starts its FAST FORWARD motion. Thus, the mechanism can be adjusted so that it works equally well at all speeds involved.

While we have shown the brackets 70 and 72 for the hydraulic and air sequencing mechanism mounted on the slicing table 10, in most machines this mechanism can be mounted below the table and thus protected from mechanical injury. In that case the lever 75 would project from the bottom of the control box 130.

In some of our claims we have referred to the gripper carriage as a slab advance carriage inasmuch as patentable novelty is present whether or not this carriage has gripper claws. Also, the feed conveyor 24 and its control means may be omitted in certain installations which are less fully automatic than the entire disclosure in our specification.

Some changes may be made in the construction and arrangement of the parts of our in-feed mechanism without departing from the real spirit and purpose of our invention, and it is our intention to cover by our claims any modified forms of structure or use of mechanical equivalents which may reasonably be included within their scope.

We claim as our invention:

1. In-feed mechanism comprising a continuously operable slicer conveyor adapted to be positioned alongside the slicer table of a slicing machine having a slicing knife and a slab advance carriage, a fence adjacent the downstream end of said slicer conveyor to limit the movement of slabs of meat or the like by said slicer conveyor, a slab carriage movable laterally across said slicer conveyor to move a slab which is against said fence onto said slicer table ahead of said slab advance carriage, hydraulic means for operating said slab advance carriage, and sequence control means for said hydraulic means operable to cause said slab advance carriage to move rapidly forward until the advance edge of the slab is adjacent said slicing knife and then to slowly advance at the desired slicing rate.

2. An in-feed mechanism according to claim 1 wherein said slab advance carriage includes means to grip the slab as the carriage advances and to release the slab end when said gripping means is adjacent the slicing knife, and wherein a slab end receiving chute is located adjacent the slicing knife to receive the slab end when so released.

3. An in-feed mechanism according to claim 1 wherein a feed conveyor is provided to feed slabs to said slicer conveyor, and means is provided responsive to a plurality of slabs on said slicer conveyor to stop the operation of said feed conveyor.

4. An in-feed mechanism according to claim 1 wherein said sequence control means comprises a control valve in the hydraulic circuit of said hydraulic means having slow forward, fast forward and fast reverse positions, a valve actuating arm pivotally mounted with respect to sad slicer table, and cam means carried by said slab advance carriage and cooperating with said valve actuating arm to initially move it from slow forward position to fast forward position after said slab advance carriage starts to move forward, to move it from fast forward position to slow forward position when the advance edge of the slab is adjacent said slicing knife, to move it from slow forward position to fast reverse position when the slab has been completely sliced with the exception of a marginal end at the trailing end of the slab, and to move it from fast reverse position to slow forward position as said slab advance carriage reaches its rearwardmost position.

5. An in-feed mechanism according to claim 4 wherein a rocker arm is also pivotally mounted with respect to said slicer table and is operatively connected with said valve actuating arm, a pair of projections are carried by the opposite ends of said rocker arm and a projection is carried by one end of said valve actuating arm, said cam means coacting with said projections of said rocker arm to effect change of said control valve from slow forward position to fast forward position and from fast forward position to slow forward position, and coacting with said projection of said valve actuating arm to effect change of said control valve from slow forward position to fast reverse position and coacting with one of said projections of said rocker arm to change from fast reverse position to slow forward position.

6. An in-feed mechanism according to claim 5 wherein spring pressed detents are carried by said cam means, and said rocker arm and valve actuating arm have detent notches coacting therewith to complete the movements of said valve actuating arm to fast reverse and slow forward position.

7. An in-feed mechanism according to claim 2 wherein an intermittently operated feed conveyor is provided to feed slabs to said slicer conveyor, and means is provided responsive to slabs on said slicer conveyor to control the intermittent operation of said feed conveyor.

8. An in-feed mechanism according to claim 2 wherein said sequence control means comprises a control valve in the hydraulic circuit of said hydraulic means having slow forward and fast forward positions, a valve actuating arm pivotally mounted with respect to said slicer table, and means carried by said slab advance carriage and cooperating with said valve actuating arm to initially move it from slow forward position to fast forward position after said slab advance carriage starts to move forward, and to move it from fast forward position to slow forward position when the advance edge of the slab is adjacent said slicing knife.

9. An in-feed mechanism according to claim 7 wherein said sequence control means comprises a control valve in the hydraulic circuit of said hydraulic means having slow forward, fast forward and fast reverse positions, a valve actuating arm pivotally mounted with respect to said slicer table, and means carried by said slab advance carriage and cooperating with said valve actuating arm to initially move it from slow forward position to fast forward position after said slab advance carriage starts to move forward, to move it from fast forward position to slow forward position when the advance edge of the slab is adjacent said slicing knife, to move it from slow forward position to fast reverse position when the slab has been completely sliced with the exception of a marginal end at the trailing end of the slab, and to move it from fast reverse position to slow forward position as said slab advance carriage reaches its rearward position.

10. An in-feed mechanism according to claim 9 wherein a rocker arm is also pivotally mounted with respect to said slicer table and is operatively connected with said valve actuating arm, a pair of projections are carried by the opposite ends of said rocker arm and a projection is carried by one end of said valve actuating arm, said first mentioned means coacting with said projections of said rocker arm to effect change of said control valve from slow forward position to fast forward position and from fast forward position to slow forward position, coacting with said projection of said valve actuating arm to effect change of said control valve from slow forward position to fast reverse position, and coacting with one of said projections of said rocker arm to change from fast reverse position to slow forward position.

11. An in-feed mechanism according to claim 10 wherein spring pressed detents are carried by said first mentioned means, and said rocker arm and valve actuating arm have detent notches coacting therewith to complete the movements of said valve actuating arm to fast reverse and slow forward positions at the ends of the reciprocations of said slab advance carriage.

12. An in-feed mechanism according to claim 1 wherein pneumatic means is provided for reciprocating said slab carriage, and sequence control means for said pneumatic means is provided controlled by positions of said slab advance carriage during the reciprocations thereof.

13. An in-feed mechanism according to claim 1 wherein pneumatic means is provided for reciprocating said slab carriage, said sequence control means comprises a control valve in the hydraulic circuit of said hydraulic means having slow forward, fast forward and fast reverse positions, a valve actuating arm is provided which is pivotally mounted with respect to said slicer table, and cam means is carried by said slab advance carriage and cooperates with said valve actuating arm to initially move it from slow forward position to fast forward position soon after said slab advance carriage starts to move forward, to move it from fast forward position to slow forward position when the advance edge of the slab closely approaches said slicing knife, to move it from slow forward position to fast reverse position when the slab has been completely sliced with the exception of a marginal end thereof, and to move it from fast reverse position to slow forward position as said slab advance carriage reaches its rearward position, control valves are provided for said pneumatic means, and said cam means actuates said control valves in accordance with selected positions of said slab advance carriage during the reciprocations thereof.

14. An in-feed mechanism according to claim 5 wherein pneumatic means is provided for reciprocating said slab carriage, control valves are provided for said pneumatic means, and said cam means actuates said control valves to return said slab carriage when said slab advance carriage reaches a mid-position in its forward travel and to advance said slab carriage when said slab advance carriage approaches its rearwardmost position.

15. An in-feed mechanism according to claim 5 wherein a manual control is provided for said valve actuating arm to override the actuation thereof by said cam means.

16. An in-feed mechanism according to claim 1 wherein a side trim knife is provided for the slab as it is advanced by said slab advance carriage, and a chute is provided for receiving the trimming from the slab.

17. In-feed mechanism comprising a slicer conveyor adapted to be positioned alongside the slicer table of a slicing machine having a slicing knife and a slab advance carriage, means adjacent the downstream end of said slicer conveyor to limit the movement of slabs by said slicer conveyor, a slab carriage movable laterally across said slicer conveyor to move a slab which is against said means onto said slicer table ahead of said slab advance carriage, hydraulic means for reciprocating said slab advance carriage, pneumatic means for reciprocating said slab carriage, and sequence control means for said hydraulic means and said pneumatic means operable to cause said slab advance carriage to move rapidly forward until the advance edge of the slab is adjacent said slicing knife and then to slowly advance at the desired slicing rate, and said slab carriage to retract during the forward movement of said slab advance carriage and advance upon said slab advance carriage approaching its rearwardmost position.

18. An in-feed mechanism according to claim 17 wherein said slab advance carriage includes a means to grip rear end of the slab as the carriage advances and to release the rear slab end when said gripping means is adjacent the slicing knife, and wherein a chute is located adjacent the slicing knife to receive the rear slab end when so released.

19. An in-feed mechanism according to claim 17 wherein said sequence control means comprises a control valve in the hydraulic circuit of said hydraulic means having slow forward, fast forward and fast reverse positions, a valve actuating arm is pivotally mounted with respect to said slicer table, and cam means is carried by said slab advance carriage and cooperates with said valve actuating arm to initially move it from slow forward position to fast forward position after said slab advance carriage starts to move forward, to move it from fast forward position to slow forward position when the advance edge of the slab approaches said slicing knife, to move it from slow forward position to fast reverse position when the slab has been completely sliced with the exception of a marginal end thereof, and to move it from fast reverse position to slow forward position as said slab advance carriage reaches its rearwardmost position.

References Cited

UNITED STATES PATENTS

| 2,073,082 | 3/1937 | Walter | 146—94 |
| 2,642,910 | 6/1953 | Garapolo | 146—95 |
| 3,010,499 | 11/1961 | Dahms et al. | 146—94 |

WILLIAM W. DYER, JR., *Primary Examiner.*

JAMES M. MEISTER, *Examiner.*